(12) United States Patent
Guiney (10) Patent No.: US 8,313,203 B1
(45) Date of Patent: Nov. 20, 2012

(54) INFLATABLE DEVICE FOR THE DIFFUSION AND DIRECTION OF LIGHT

(75) Inventor: Thomas Guiney, Brooklyn, NY (US)

(73) Assignee: Thomas Guiney, Menlo Park, CA (US)

( * ) Notice: Subject to any disclaimer, the term of this patent is extended or adjusted under 35 U.S.C. 154(b) by 84 days.

(21) Appl. No.: 12/948,662

(22) Filed: Nov. 17, 2010

(51) Int. Cl.
*G03B 15/02* (2006.01)
(52) U.S. Cl. .................................................. 362/18
(58) Field of Classification Search ............. 362/3–18
See application file for complete search history.

(56) References Cited

U.S. PATENT DOCUMENTS 7,399,097 B1 * 7/2008 DeLaPaz .................. 362/18

* cited by examiner

*Primary Examiner* — Jason Moon Han (57) ABSTRACT

A system for diffusing and directing the light from light-weight, portable, photographic light sources that is inflatable, flexible, and lightweight, and has two separate layers of translucent diffusion material (105 and 106) and has sides (102) of an opaque material. The two layers of diffusion material may diffuse the light to different degrees. It can be rapidly mounted to or removed from the light source (118), and is designed in such a way as to be readily fitted with an external light-directing device (120). It can be inflated quickly and it can also deflated and stowed conveniently and rapidly.

18 Claims, 6 Drawing Sheets

INFLATABLE DEVICE FOR THE DIFFUSION AND DIRECTION OF LIGHT

CROSS-REFERENCE TO RELATED APPLICATIONS

This application claims the benefit of PPA Ser. No. 61/280,358, filed Oct. 29, 2009 by the present inventor.

FEDERALLY SPONSORED RESEARCH

Not Applicable

SEQUENCE LISTING OR PROGRAM

Not Applicable

BACKGROUND

1. Field

This device pertains to lighting for photography, cinematography, and videography, specifically to light diffusers, and more specifically light diffusers for lightweight, highly portable lighting fixtures.

2. Prior Art

In the fields of cinematography, videography, and photography, one of the essentials of the craft is having illumination of sufficient intensity and appropriate quality to expose the image in the desired manner. It is commonly agreed that an essential element of these crafts is being able to soften the sources of illumination. Another essential element of these crafts is being able to deliver a high quality image even with a minimal crew. Yet another important element of these crafts is being able to prevent light from falling on undesired areas of the image. The prior art in this field addresses only some of these essential needs, since these needs are often at odds with each other.

There are a wide variety of lighting instruments, luminaires and flashes that answer to the need of portable, convenient illumination. Many of these luminaires are small and lightweight, to meet the need for portability, and some of those are battery powered, in order to be even more portable. Many photographers, videographers, and cinematographers find these highly portable luminaires particularly useful, since they may be working either on their own or with a very small crew where mobility and flexibility are at a premium.

However, in order to be portable, most of these luminaires are very small. It is generally understood in the craft that a small light source, such as a single, unshaded light bulb, is "hard", where the shadows are hard-edged and clearly defined. Examples of highly portable luminaires are seen in U.S. Pat. Nos. 7,163,302 (2005) and 7,331,681 (2008) to Pohlert et al., 3,550,519 to Lewis (1970), 4,485,336 (1984) to Yoshiyama et al.

The need to soften or diffuse light sources has been addressed by the prior art, but with some limitations. It is understood that the light from a larger light source such as a paper lantern, is "soft", where the light falls onto the subject from a plurality of directions, wrapping around the contours of the subject, making softly-defined shadows. The studio lighting industry has many techniques that answer this need, but most involve freestanding equipment and crew members to set them up, and are thus unsuitable for the solo operator or small crew, such as a news cameraman or reality-television camera crew. The prior art offers a number of ways to make a light source larger, usually by bouncing the light off of a larger reflective surface or by passing the light through a translucent membrane or panel. Examples are U.S. Pat. Nos. 4,446,506 to Larson (1984), 5,023,756 to Regester (1991), 5,311,409 to King (1994), 6,076,935 to Kester (2000).

However, none of the prior art is optimal for the solo cameraman in that these inventions are all composed of fabric supported by metal rods and rings or else of rigid panels, giving them some degree of weight, bulk, and inconvenience of setup and transport. Particularly for a light mounted on the handheld camera, very low weight is extremely important. In addition, the prior art all being partially composed of rigid structures or rods, it is difficult to rapidly stow them in the same bag or case as the lighting instrument, and they often necessitate their own bag or case, giving the solo cameraman one more issue to manage.

Maximizing the softness of a light source with minimal loss of light output is also important. All the prior art generally does this using one of two techniques, either bouncing the light off of a large reflective surface onto the subject, or directing the light through a translucent diffusive layer of material towards the subject. Studio lighting technicians have learned that one can often gain a greater degree of softness with less loss of intensity by passing the light through not one heavy diffusive layer but through two thinner layers of diffusive translucent material. None of the prior art has put this technique into effect in the area of lightweight portable light diffusers while still answering the needs of lightweightness of device and controllability of light.

When a light source becomes softer, because it is larger and more diffuse, it necessarily becomes messier, causing light to fall on undesired areas. There is a need to direct the light after softening it. The prior art has answered this need with a variety of devices, such as U.S. Pat. No. 5,556,186 to Pilby (1996), but not for the most lightweight and portable light-diffusing devices. There are other very lightweight light diffusing devices, such as U.S. Pat. No. 4,146,918 to Tureck (1979), but none with the means to control undesired light spill.

SUMMARY

In accordance with one embodiment, an inflatable light-diffusing device comprises a chamber for the diffusing of the light from portable lightweight luminaires or flashes, having translucent and diffusive front and back faces, opaque sides, top and bottom with reflective interior faces, and attachment mechanisms by which light-directing devices such as egg-crates, louvers, or honeycombs may be quickly mounted to the front. This same embodiment also has means of rapidly and easily being attached to or detached from the luminaire or flash, and shall be of some flexible material so that it may be rapidly and easily inflated, deflated, collapsed, and stowed. It will also be substantially lightweight and therefore practical for use on a luminaire mounted on a handheld camera.

DRAWINGS

Figures

DRAWINGS

Reference Numerals

102—opaque side panel
104—standard air valve
105—rear panel of light-diffusive translucent material
106—front panel of light-diffusive translucent material
108—flaps by means of which the device is mounted to the luminaire
110—attachment mechanism by means of which the device is mounted to the luminaire
114—mounting strap by means of which the light-directing device or eggcrate is mounted to the embodiment.
116—mounting point to which the eggcrate is mounted.
118—light source or luminaire
120—light-directing device, such as an eggcrate or honeycomb
122—light emitted from luminaire
124—bounced light inside the device

DETAILED DESCRIPTION

FIGS. 1, 2, 3, 8

This device consists of a lightweight inflatable air chamber for the diffusion and direction of light with a front panel substantially larger than the rear panel.

Figure 1:
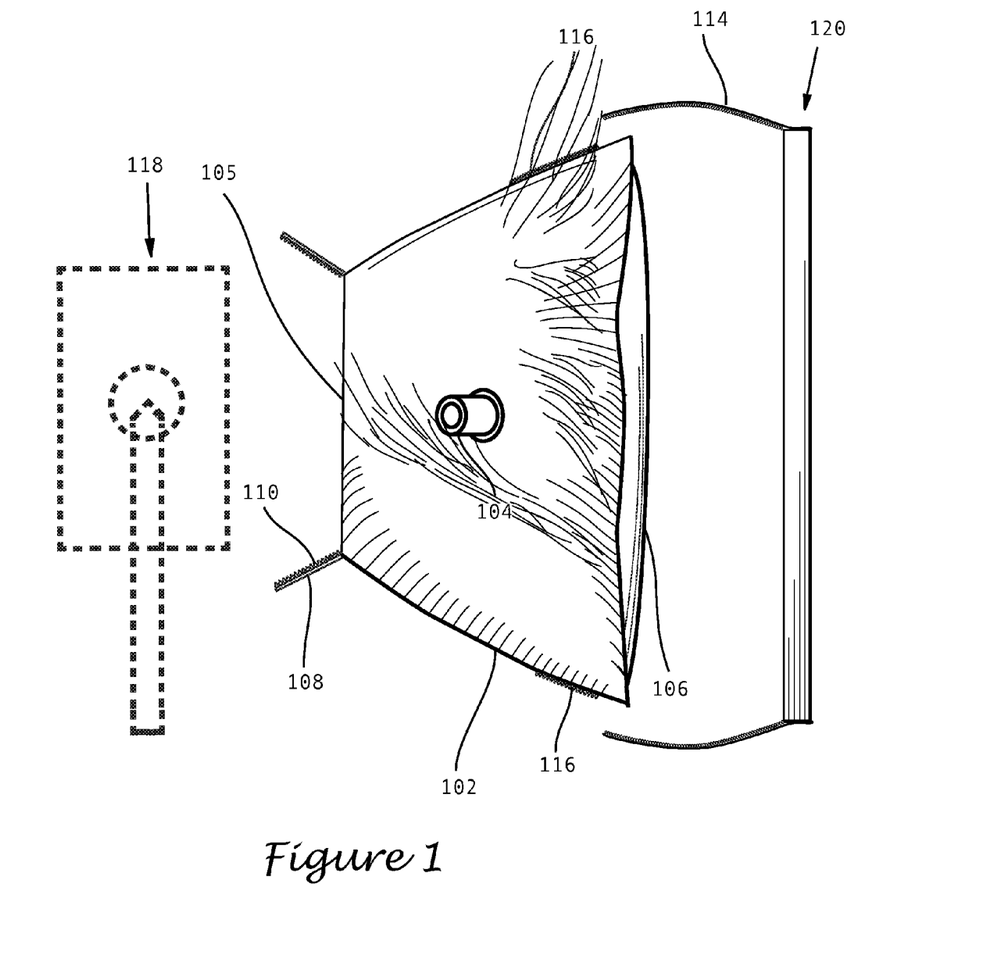
FIG. 1 shows a side aspect of one embodiment, also showing a luminaire drawn in dotted line, and also showing an example of a light-directing device or eggcrate 120 which may be mounted to the front of the embodiment.

FIG. 1 shows a side aspect of one embodiment contemplated. This device will mount directly to the front of the luminaire 118, with rear panel 105 largely flush against the front panel of the luminaire 118. The rear panel 105 will be made of translucent lightweight flexible material such as frosted polyvinyl chloride (PVC) to allow passage of light from the lighting unit 118 into the interior of the device. This rear panel 105 will be of translucent, slightly diffusive material that will scatter and soften light rays passing through it. The front panel 106 of the device will be substantially larger than the rear panel, and will be made of a lightweight, flexible, translucent, light diffusing material such as PVC, which will diffuse and soften the light as it emerges from the device. While frosted PVC is at this time considered a suitable material, the invention shall not be limited to the use of PVC, should another more suitable lightweight, flexible, light diffusive material be found appropriate. Connecting the front and the rear panels will be trapezoid-shaped side panels 102 of an opaque, flexible, lightweight material. These side panels 102 will optimally be black on the outside and white or silver on the inside. The seams between adjoining panels will be joined so as to be airtight by some suitable method such as RF welding or heat sealing.

The device will be constructed with means by which it may be mounted directly to the luminaire 118. Attached around the rear panel 105 will be mounting flaps 108 made of a similar or same material as the side panels 102. These mounting flaps 108 will be the means by which the device will be mounted to the luminaire 118. Mounting flaps 108 will be affixed with attachment mechanism or fastener 110 by which the device may be temporarily and rapidly mounted to the luminaire 118. In the embodiments pictured in FIGS. 1 through 6, the best contemplated attachment mechanism to mount the device to the luminaire is hook-and-loop fasteners, although other mechanisms may be used for other embodiments, such as snaps or buttons, provided they be lightweight and simple to use using no tools or special skill.

Figure 2:
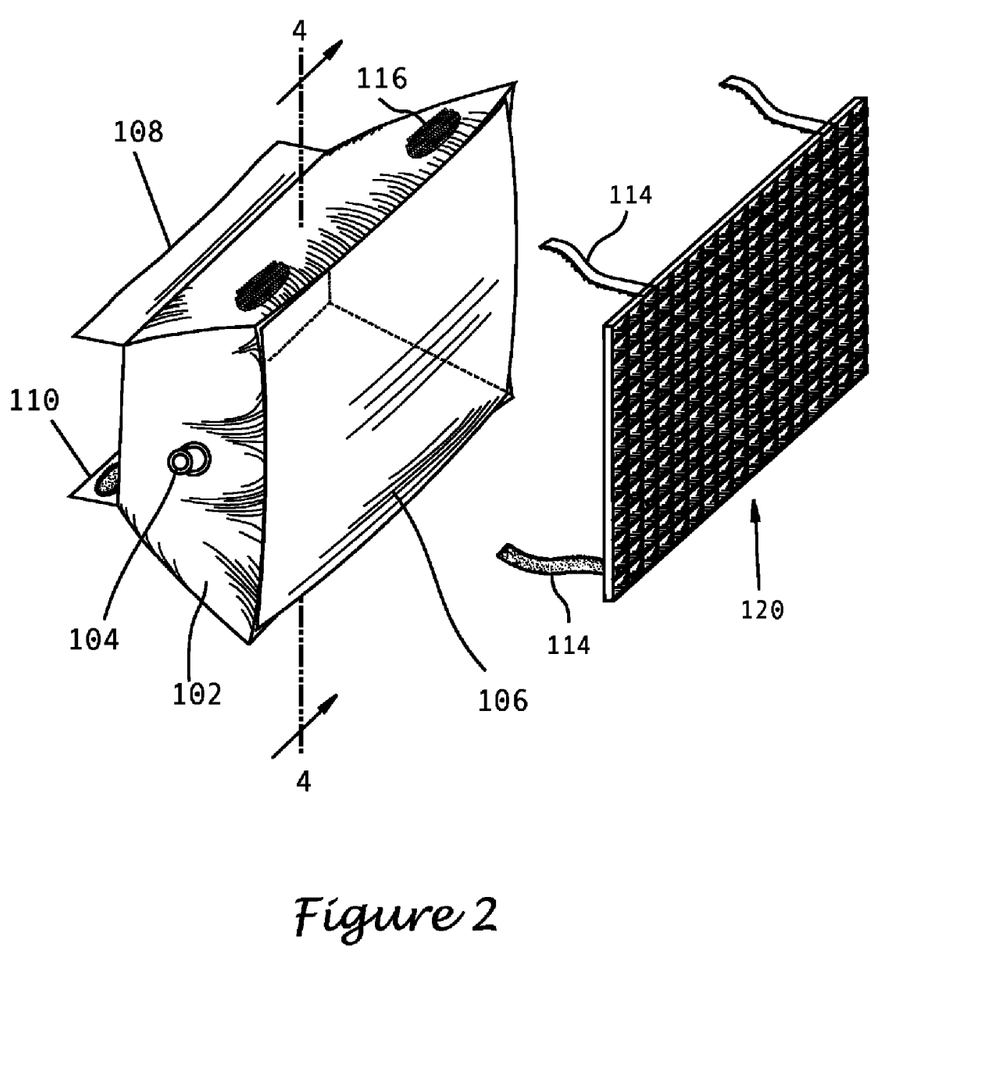
FIG. 2 shows three-quarter perspective of the same embodiment, also showing eggcrate 120, to show the means by which the eggcrate 120 is to be attached to the embodiment.
Figure 3:
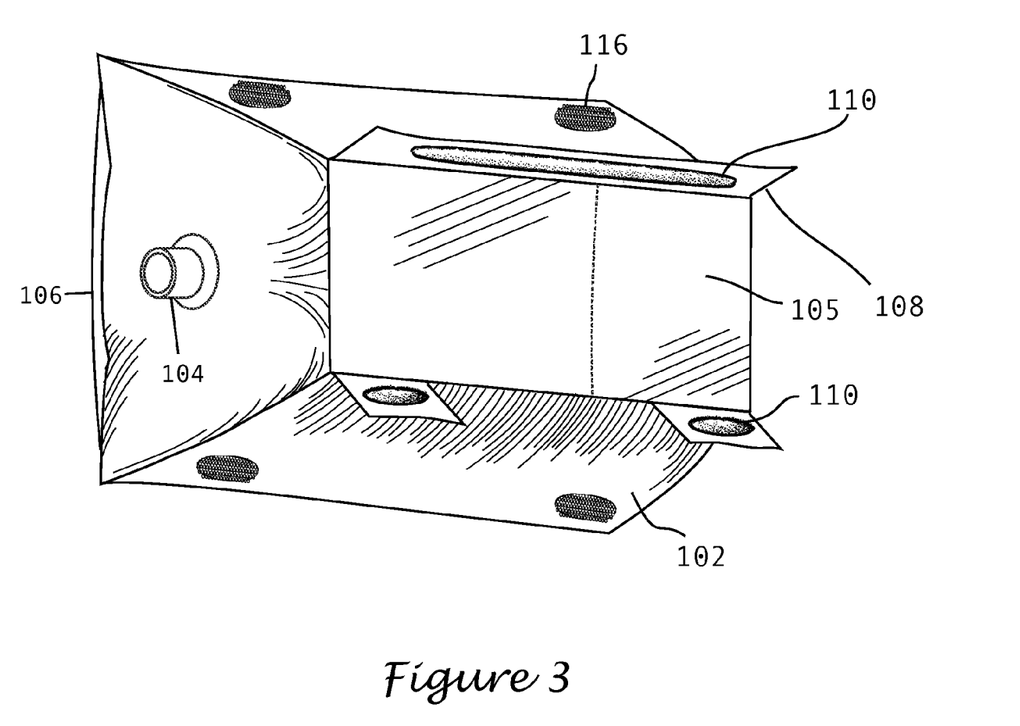
FIG. 3 shows a perspective of the rear of the same embodiment, showing the translucent face of the device that is immediately in front of the luminaire, and the mounting flaps by which the device may be attached to the luminaire.

Included in the construction of the device will be means by which an eggcrate 120 or other light-directing device may be attached closely to front panel 106. In this embodiment, this means of attachment will consist of a plurality of mounting points 116 to which mounting straps 114 are attached, thereby holding light-directing device or eggcrate 120 tightly against front panel 106. The ideal means contemplated at this time for attaching mounting points 116 to mounting straps 114 is hook-and-loop fasteners, but this does not exclude some other means of rapid temporary attachment, such as snaps or buttons, so long as it is rapid and easy to attach and detach and requires no special skill or tools to operate.

Set into one of the side panels 107 of the embodiment will be a conventional air valve 104 by which the device may be inflated with air.

Operation of First Embodiment

Figure 8:
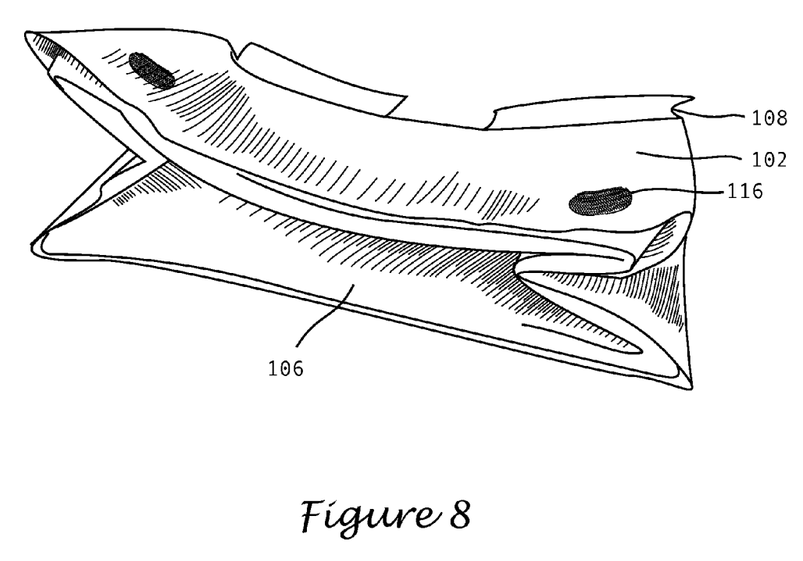
FIG. 8 is a perspective of the embodiment in its deflated state.

The first embodiment here contemplated is pictured in FIGS. 1 through 6. The device will be inflated using valve 104 until it is full of air and it holds its roughly trapezoidal shape as seen in FIG. 2. This valve will be operable using no special skill or tools, although should the user desire to use a pump, this will be possible. When not filled with air the device will be deflated as seen in FIG. 8, and then stowed conveniently in a pocket, gadget bag or equipment bag or case, such as the one that is used to carry the luminaire.

In order to be as simple to use as possible, this embodiment pictured in FIGS. 1 through 8 will mount directly to the luminaire by means of flaps 108. Flaps 108 are affixed with fasteners 110, which will attach to a corresponding fastener on luminaire 118. By using hook-and-loop fasteners attached to these mounting flaps and also to the lighting fixture, this device can be far more lightweight than other light-diffusing softboxes described by prior art which usually use some sort of metal or plastic brackets to fasten the diffusing device to the light fixture.

Figure 4:
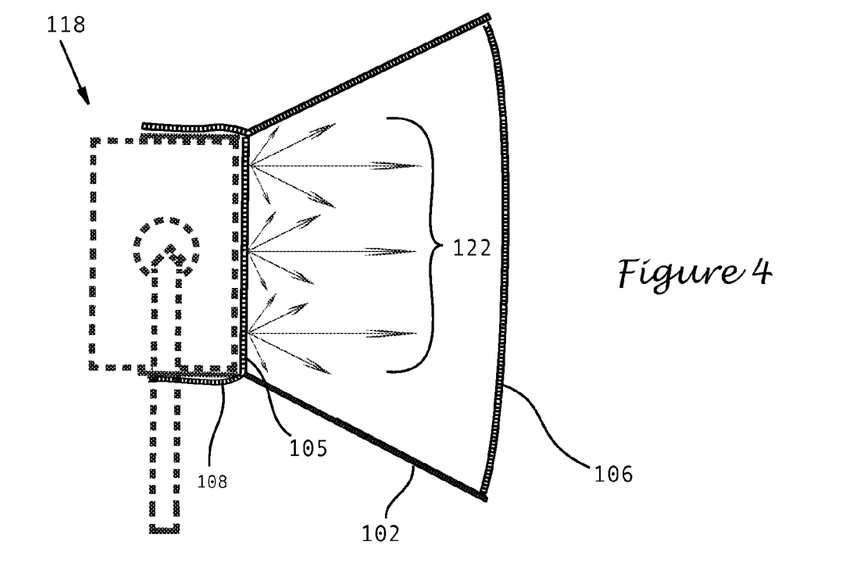
FIG. 4 shows a longitudinal section of the embodiment taken on line 4-4, showing the behavior of the light after passing through rear panel 105 of the embodiment.
Figure 5:
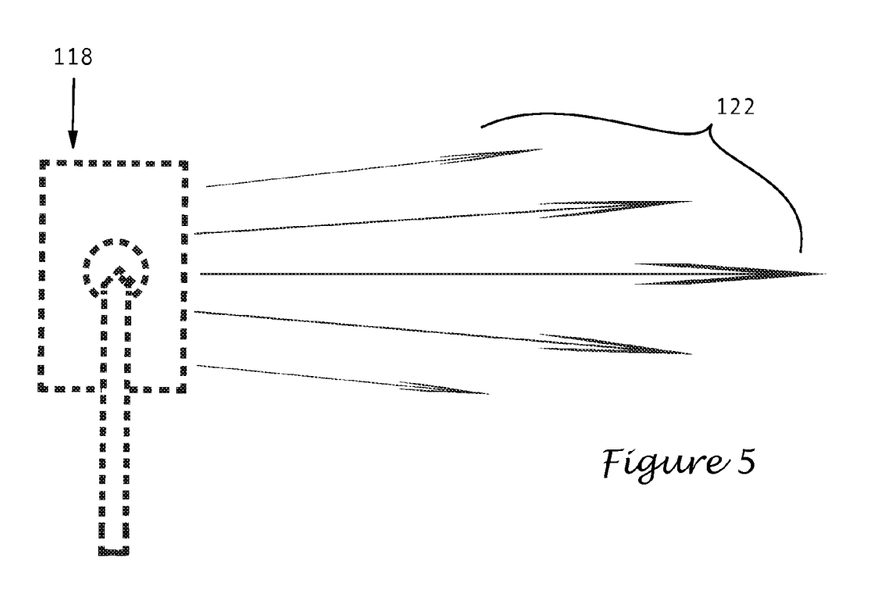
FIG. 5 shows the same section as in FIG. 4 of luminaire 118 with which the embodiment is likely to be used, showing an approximation of the behavior of the emitted light 122 in the absence of the embodiment.
Figure 6:
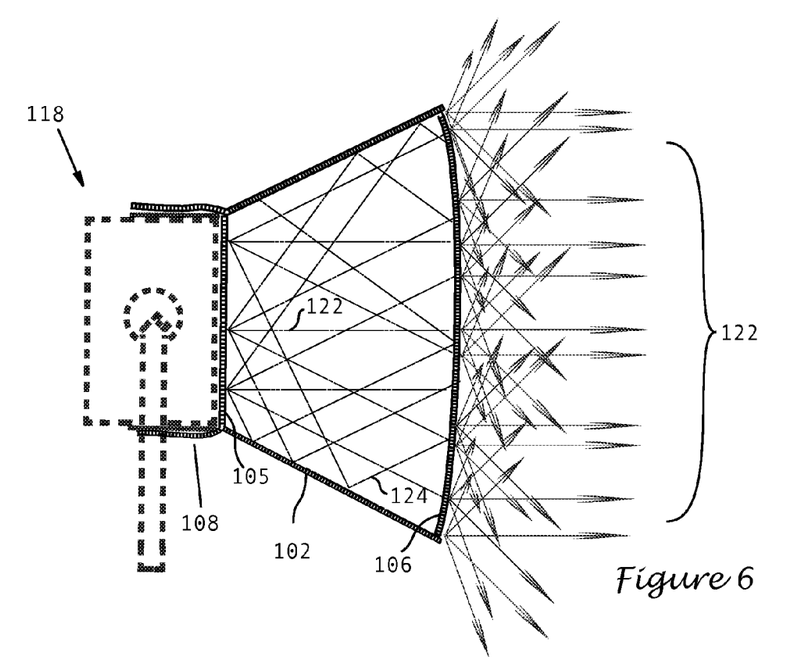
FIG. 6 shows the same section as in FIG. 4, showing an approximation of the behavior of the light 122 after passing through both rear panel 105 and front panel 106.

When the embodiment is mounted to luminaire 118, the rear panel 105 will sit flush or nearly flush against the face of the lighting instrument 118 so that nearly all of the light emitted by the instrument 118 will pass through the device as seen in FIG. 4. The rear panel 105 will be made of a translucent material that is frosted to spread and scatter the light 122 as it enters the device. In FIG. 4 is visible the light 122 emitted from luminaire 118 being scattered somewhat by passing through rear panel 105. Light 122 will then be further scattered by passing through front panel 106, as seen in FIG. 6. Since the light 122 will be scattered upon entering the device through rear panel 105, it will more evenly fill the front panel 106, rather than only lighting up a portion of the front panel 106. Filling front panel 106 more evenly creates a larger, softer, more pleasing light source. Also shown in FIG. 6 is the effect of side panels 102 which have reflective inner surfaces, redirecting any bounced light 124 towards front panel 106 to minimize loss of light intensity to absorption inside the device.

This embodiment shall be affixed with mounting points 116 to enable the rapid and temporary attachment of light-directing devices 120 to the front face 106 of the embodiment. These devices, hereafter referred to as "eggcrates", are arrays of fins or slats of an opaque material set parallel to the desired path of the light rays 122, blocking those traveling in undesired directions, e.g. off to the sides. These eggcrates are commonly seen used on overhead fluorescent lighting in office and industrial settings and are well-established in the prior art. These eggcrates 120 will be temporarily and rapidly attached and detached from mounting points 116 by means of mounting straps 114. At this time, the best attachment mechanism contemplated between mounting straps 114 and mounting points 116 is hook-and-loop fasteners.

Figure 7:
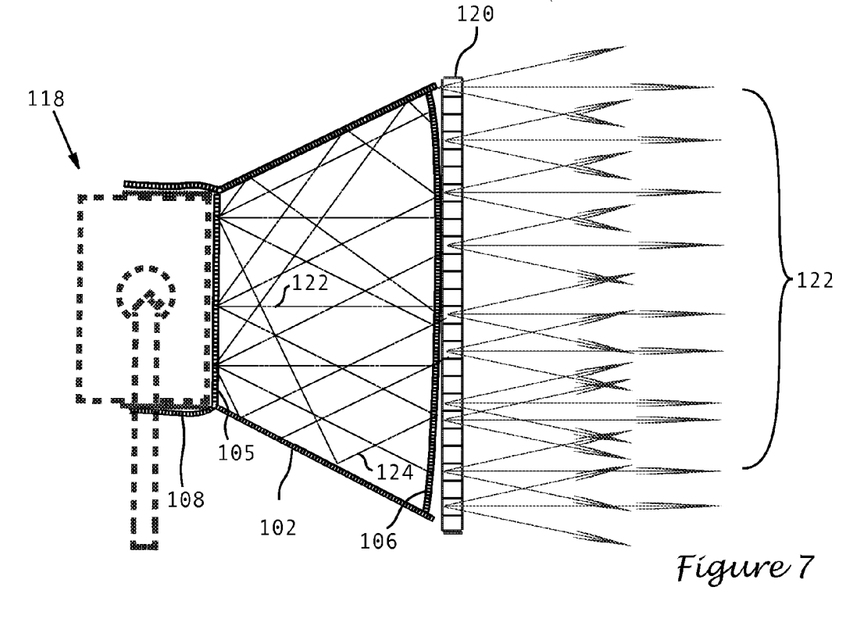
FIG. 7 shows the same section as in FIG. 4, showing an approximation of the behavior of the light 122 after passing through both rear panel 105 and front panel 106 and eggcrate 120.

FIG. 7 approximates the behavior of light 122 when it passes through rear panel 105, front panel 106, and then eggcrate 120. Notable in FIG. 7 is that although the light 122 is now softened, coming from a larger source than before, it is refocused in the primary direction after passing through eggcrate 120, reducing the amount of light scattering away from the subject.

The whole device being made of lightweight, flexible, plastic and substantially airtight material such as polyvinyl chloride (PVC), it will collapse or fold down to be nearly flat when not in use, to fit easily in the same case or gear bag as the lighting instrument itself, as can be seen in FIG. 8. Being made of such flexible materials, it can be stowed in a variety of configurations, such as folded up and slid into a flat pocket, crumpled and inserted into a gadget bag, or deflated flat and placed in an equipment case with other equipment.

CONCLUSIONS, RAMIFICATIONS, AND SCOPE

It will be seen that at least one embodiment of this device will be superior to other small light-diffusing devices for the following reasons:
a) Being inflatable, it is more lightweight than other portable light-diffusing systems that are in the prior art, and thus practical for use on a luminaire mounted to a handheld camera.
b) Having a front and a rear ply through which the light passes, the light may be diffused by each of these two layers of material, making a softer than would be possible by only having one layer of heavy diffusion at the front of the device, which is the norm for many light-diffusing devices on the market today. Using two layers of lighter diffusion rather then one layer of heavy, this device softens the light more efficiently, with less loss of intensity.
c) Being attached to the lighting fixture simply with rapid and temporary mechanisms such as hook-and-loop fasteners rather than with any kind of rigid clip, bracket, or buckle, the embodiment can be lighter weight and simpler to use.
d) Being designed to enable the rapid attachment of light-directing "eggcrates", "honeycombs", or "louvers", it affords a greater degree of control than other small diffusing devices on the market.
e) Being inflatable, it may be fully collapsed and rapidly stowed in a variety of ways, including being stowed in the same case or gear bag as the lighting fixture.
f) Being inflatable, it can be rapidly deployed and set up.
g) Having opaque sides with reflective inner surfaces, the light is not just softened but also by the device is focused forward towards the photographic subject.

RAMIFICATIONS

While my above description contains many specificities, these should not be construed as limitations on the scope, but rather as an exemplification of one ideal embodiment. Many other variations are possible.

For example, with regard what light-directing mechanism may be mounted to the front of the device, in this embodiment an eggcrate was used as an example, but another light directing device such as a honeycomb or louver could be used instead on this or a different embodiment.

For another example, the means by which the embodiment is rapidly and conveniently attached to the luminaire was described as being ideally hook-and-loop fasteners, but could also be another lightweight rapid mechanism such as snaps or buttons or elastic straps or ties.

For another example, the means by which the eggcrate can be mounted to the front of the embodiment is described as being hook fasteners on the opaque side panels of the embodiment and straps of loop fasteners mounted to the eggcrate, but other options are possible that are still within the scope of the invention, such as exchanging the placement of hooks versus loops on the same mechanism, or yet other variations. Other imagined variations of this built-in, convenient attachment and detachment mechanism are the following. The side panel 107 could extend a short distance out in front of front panel 106 to form a lip around the front panel, the inside surface of which could be affixed with loop fasteners, the converse of which would be affixed to the outer perimeter of the eggcrate, permitting the eggcrate to be rapidly attached to said lip, covering front panel 106 with the eggcrate.

For yet another example of variation within the scope, the ideal embodiment is imagined to be inflated by mouth, but this does not exclude inflating the embodiment with some type of mechanical pump.

Yet another example of variation within the scope is that an alternative embodiment could only have one section inflated with fluid to give the whole device its structure, with the inflated section holding erect and separate the other parts of the embodiment, to enable the embodiment to be set up more quickly.

Yet another variation within the scope is variation in the materials of which the embodiment is constructed. At this time, the ideal material envisioned is PVC, but any other material that provided similar flexibility, airtightness, and lightweightness could also be suitable and within the novel scope of this invention.

The invention claimed is:
1. A diffuser system for a photographic luminaire or flash, characterized by being lightweight and collapsible but self-supporting, which comprises
   a. an inflatable flexible structure for mounting onto the luminaire or flash,
   b. front and back panels of light-diffusive translucent materials, said front panel having a front face,
   c. side panels of substantially opaque material with reflective inner surfaces,
   d. a valve to enable inflation of said structure.
2. The diffuser system of claim 1 where said front panel is larger than said rear panel.

3. The diffuser system of claim 2, where the front panel and the rear panel are made of different materials which diffuse the light passing through them to a greater or lesser degree.

4. The diffuser system of claim 1, wherein an attachment means is provided for said diffuser system to be mounted directly to the luminaire.

5. The diffuser system of claim 4, said attachments means comprises a plurality of flaps.

6. The diffuser system of claim 5, wherein said flaps are affixed with hook-and-loop style fasteners to permit rapid attachment of said diffuser system to said luminaire.

7. The diffuser system of claim 1, wherein an attachment means is provided for said diffuser system to be mounted with light-directing devices.

8. The diffuser system of claim 7, wherein said attachment means comprises a plurality of sections of hook fasteners affixed to an outside of the side panels and a plurality of straps of loop fasteners affixed to the light-directing devices to permit rapid and temporary attachment of said light-directing devices to a front of said front panel.

9. The diffuser system of claim 7, wherein said attachment means comprises a plurality of sections of loops fasteners affixed to an outside of the side panels and a plurality of straps of hook fasteners affixed to the light-directing devices to permit rapid and temporary attachment of said light-directing devices to a front of said front panel.

10. The diffuser system of claim 1, where said inflatable structure is constructed of flexible materials, that when deflated said inflatable structure may be conveniently collapsed and stowed.

11. A system for diffusion and direction of photographic lighting, characterized by being lightweight and collapsible, and having a shape supported by inflation when mounted to a luminaire, comprising
   a. a rear panel of translucent, diffusive, substantially airtight material;
   b. a front panel of translucent, diffusive, substantially airtight material;
   c. a plurality of opaque side panels joined between said rear panel and said front panel;
   d. close to said rear panel, an attachment means for providing said diffuser system to be mounted directly to the luminaire;
   e. close to said front panel, an attachment means for providing said diffuser system to be mounted with light-directing devices, to permit rapid and temporary attachment of said light-directing devices to a front of said front panel;
   f. a valve to enable inflation of said diffuser system.

12. The diffuser system of claim 11, where an interior facing of said opaque sides are substantially reflecting and an exterior facing of said opaque sides is substantially black.

13. The diffuser system of claim 11, where said attachment means for providing said diffuser system to be mounted directly to said luminaire comprises flaps affixed with fasteners of a hook-and-loop system, with the corresponding fasteners affixed to said luminaire.

14. The diffuser system of claim 11, wherein said attachment means for providing said diffuser system to be mounted with light-directing devices comprises a plurality of mounting points of loop fasteners affixed to an outside of the side panels and a plurality of mounting straps of hook fasteners affixed to the light-directing devices to permit rapid and temporary attachment of said light-directing devices to a front of said front panel.

15. The diffuser system of claim 11, wherein said attachment means for providing said diffuser system to be mounted with light-directing devices comprises a plurality of sections of hook fasteners affixed to an outside of the side panels and a plurality of straps of loop fasteners affixed to the light-directing devices.

16. The diffuser system of claim 11, wherein the front panel and the rear panel diffuse light to different extents, whereby light emitted from the luminaire may be diffused to a great degree with minimal loss of intensity.

17. The diffuser system of claim 11, where the diffuser system is made of substantially flexible material whereby it may be collapsed casually in a variety of configurations to enable rapid stowage.

18. The diffuser system of claim 11, where said front panel is larger than said rear panel.

\* \* \* \* \*